Dec. 7, 1943. T. R. HARRISON 2,335,938
POWER SET FLOW METER
Filed Sept. 29, 1937 4 Sheets-Sheet 1
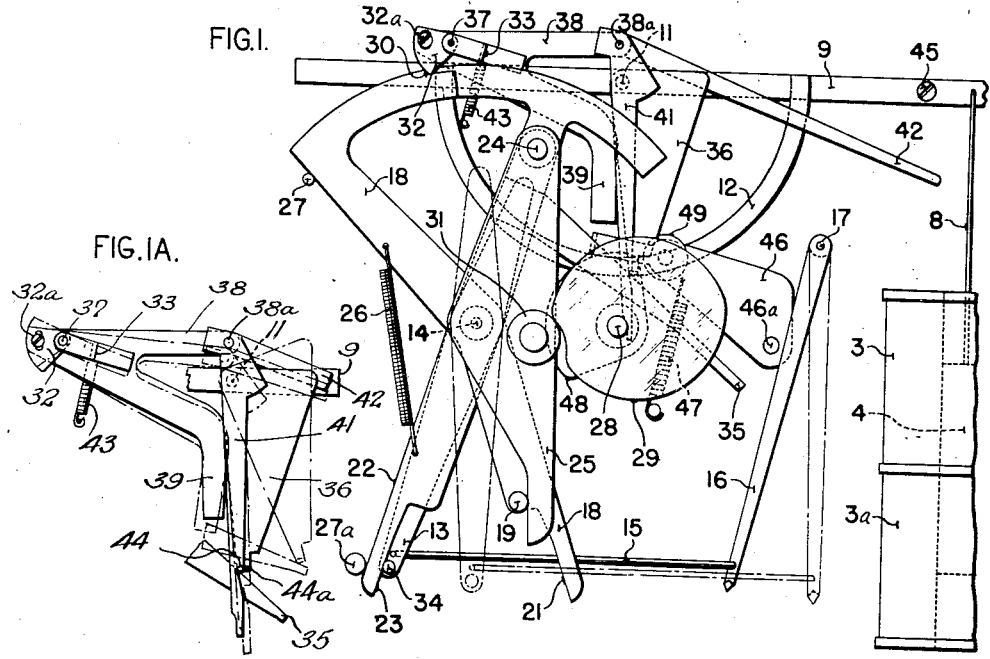
INVENTOR.
THOMAS R. HARRISON
BY George M Munschamp
ATTORNEY Dec. 7, 1943.  T. R. HARRISON  2,335,938
POWER SET FLOW METER
Filed Sept. 29, 1937  4 Sheets-Sheet 2

INVENTOR.
THOMAS R. HARRISON
BY George M. Musselman
ATTORNEY

Dec. 7, 1943.   T. R. HARRISON   2,335,938
POWER SET FLOW METER
Filed Sept. 29, 1937   4 Sheets-Sheet 3

INVENTOR.
THOMAS R. HARRISON
BY *George M. Muschamp*
ATTORNEY.

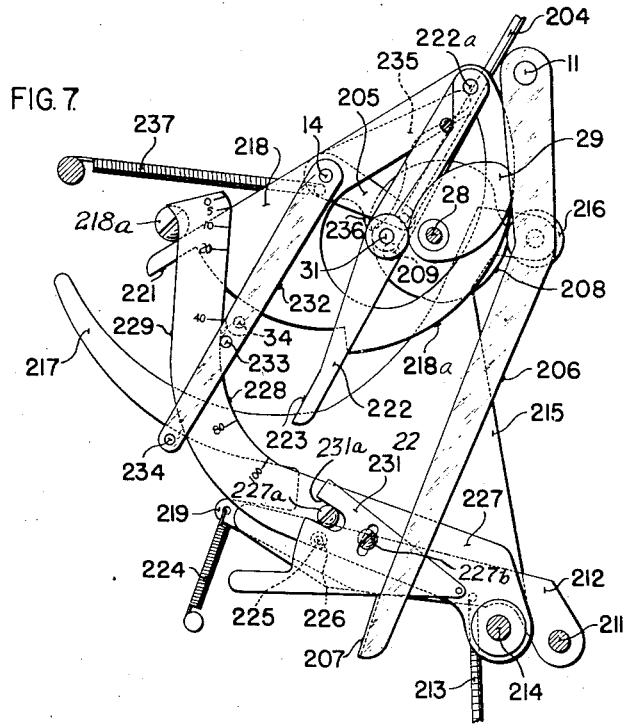
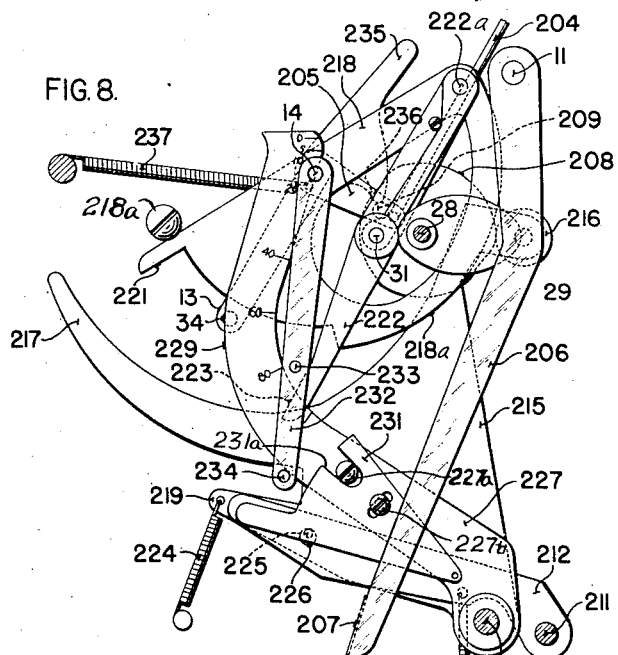

Patented Dec. 7, 1943

2,335,938

UNITED STATES PATENT OFFICE 2,335,938

POWER SET FLOWMETER

Thomas R. Harrison, Wyncote, Pa., assignor to The Brown Instrument Company, Philadelphia, Pa., a corporation of Pennsylvania Application September 29, 1937, Serial No. 166,276

19 Claims. (Cl. 234—2)

This invention relates to instrumentalities useful in the measuring and recording of variable conditions, and more particularly to mechanical relay instrumentalities for effecting adjustments under the control of an element deflecting in accordance with the fluctuations of a variable condition such as flow.

It is a specific object of my invention to provide an effective and accurate device to record and integrate the flow of a fluid by means of a source of power that is independent of the measuring instrument.

In recording the flow of a fluid it is usual to use some type of relay such as an induction bridge that is actuated by the differential pressure taken on opposite sides of an orifice plate inserted in the line thru which a fluid is flowing. The armature of an inductance bridge is very sensitive and is able to transmit only a small amount of power. According to prior practice it is usual to connect the armature of the induction bridge thru suitable linkage to the pen arm of a recorder. This procedure is, however, subject to various disadvantages because of the small power transmitted by the induction bridge armature.

In my invention these disadvantages are overcome by the use of an auxiliary source of power that is independent of the induction bridge for setting the pen of a recorder. The position of the armature of an induction bridge is measured by a feeler which in turn regulates the movement of a pair of positively driven levers which act to set the pen arm.

The various features of novelty which characterize my invention are pointed out with particularity in the claims annexed to and forming part of this specification. For a better understanding of the invention, however, and the advantages possessed by it, reference should be had to the accompanying drawings and description in which I have illustrated and described a preferred embodiment of the invention.

Of the drawings:

Fig. 1 shows one form of the invention with certain parts removed for the sake of clearness;

Fig. 1A is a view of the latch mechanism;

Fig. 2 shows the modification of Fig. 1 with the parts in a different position;

Fig. 7 is a view showing the parts of the apparatus of Fig. 5 on a larger scale and removed from the casing; and Fig. 8 is a view similar to Fig. 7 with the parts in a different position.

Figure 5:
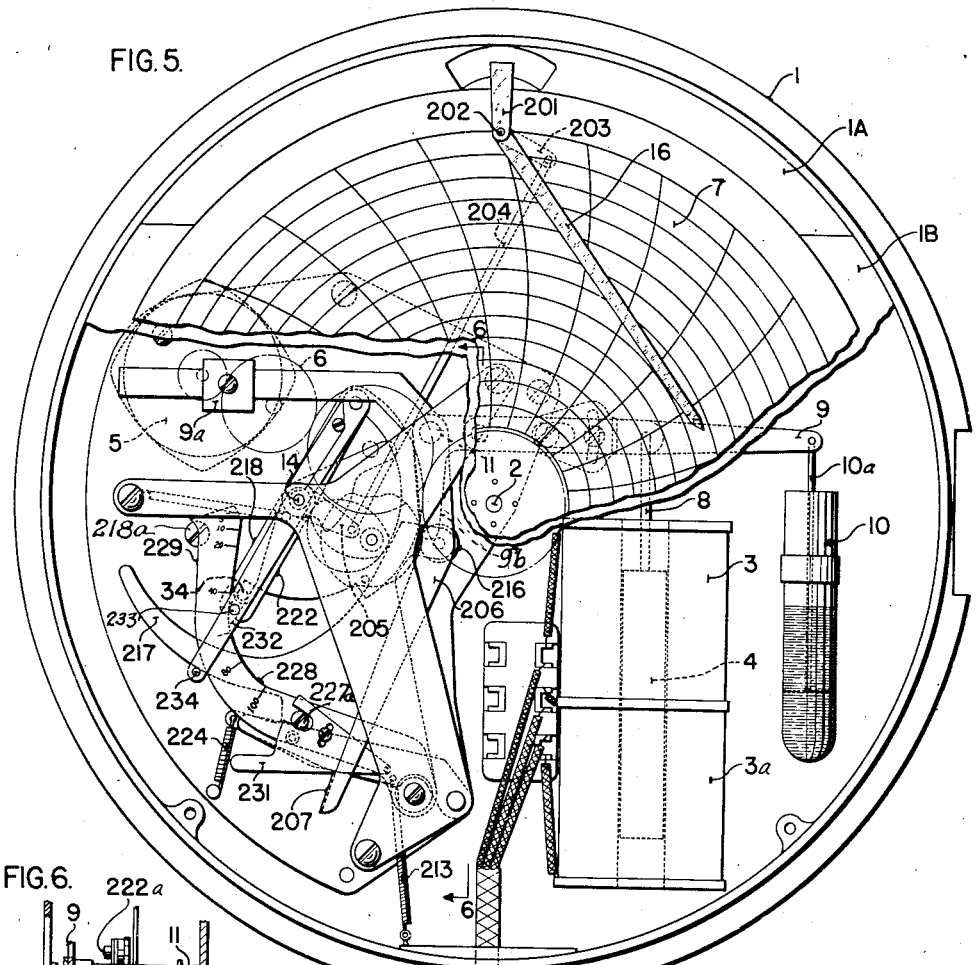
Fig. 5 is a front view of still another modification showing the parts assembled in a casing.
Figure 6:
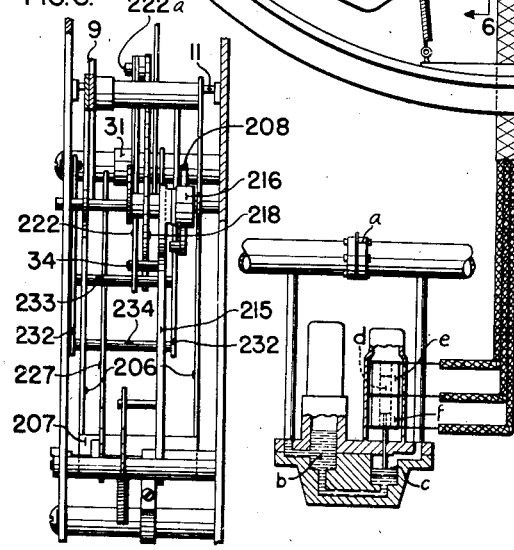
Fig. 6 is a cross sectional view taken on the lines 6—6 of Fig. 5.

Referring first to Fig. 5, my invention, although equally useful in connection with mechanical and other electrical types of flow metering systems, is here illustrated as adapted for use in the Brown electric flow meter which is now in wide commercial use and which is disclosed in my prior Patent 1,743,852 granted January 14, 1930. In this system the differential pressure across an orifice inserted in the pipe line, through which the rate of flow is to be measured, is impressed upon the sealing liquid $b$ of a U-tube manometer the level of the liquid in either leg of the manometer forming a measure of fluid rate of flow. A float $c$ in the liquid in one manometer leg rising and falling with the sealing liquid level carries an armature $d$ adapted to cooperate with inductance coils $e$, $f$ forming the transmitting element of a distant reading system. The distant reading system includes receiving coils 3, 3a electrically connected to the transmitting coils $e$, $f$ and inductively related to a receiver armature 4 which, as more fully described in my previously mentioned prior patent, is thereby given movements corresponding to the movements imparted to the armature $d$ by the manometer float.

The receiver coils 3, 3a are included in a recorder-integrator instrument of circular form provided with a casing 1 and a chart driving hub which is fixed to a shaft 2 and is rotated at a constant speed by a motor 5 through gearing 6 to make a full revolution in any desired period of time, such as once in twenty-four hours. An upper segment plate 1A cooperates with a lower segment 1B to form a closure plate for the front of the instrument casing and to form a bearing plate for a chart 7 which may be mounted on and rotated by the chart hub. The chart hub together with the recorder pen project through the closure plate and the mechanism now to be described is enclosed within the casing and in back of said plate.

The armature 4 is attached by link 8 to a lever 9 pivoted at 11. At one end of this lever is a dash-pot 10 fastened to the casing, and extending from the lever 9 is a link 10a extending into the dash-pot which is filled with a suitable liquid such as oil. A piston on the end of link 10a moving up and down in the oil serves to dampen any unusual vibrations of the lever 9. Mounted on the left-hand end of the lever 9 is an adjustable weight 9a the purpose of which is to counterbalance the weight of the armature 4 and the weight of the link 10a. This weight 9a can be adjusted along the lever 9 and may be fastened in its adjusted position by any suitable means such as the set screw there shown.

The above described parts are used in each of the modifications disclosed although the casing of the device and the manometer have not been shown with the modifications illustrated in Figures 1 to 4. Like reference numerals will be used to designate like parts throughout the following description.

Referring now to the modification of Figs. 1 and 2 it will be seen that the lever 9 has attached to it an arcuate member 12 the bottom edge of which is concentric with the shaft 11. Below and to one side of shaft 11 is another shaft 14 upon which is mounted for rotation an arm 13 the lower end of which is connected by a link 15 to a pen arm 16 pivoted at 17. This arm can be positioned in the casing in a manner shown in Fig. 5, but is here indicated diagrammatically for convenience.

Also mounted for rotation on shaft 14 are two levers, one of which is designated 18 and has the general shape of an inverted L with a pin 19 in its lower end and which is formed with straight edge 21. The other lever 22 has the general shape of a T with straight edge 23 formed on its lower end and a lever 25 pivoted at 24 on its upper part. These levers are used to set the pen arm by means of the engagement of surfaces 21 and 23 with the pin 34 on arm 13 by means of mechanism now to be described. The lever 25 is normally biased by gravity to a position where it contacts pin 19 on the lower end of lever 18. The levers 18 and 22 are biased in a counter-clockwise and clockwise direction respectively by spring 26 toward abutment with stops 27 and 27a.

To one side of shaft 14 is another shaft 28 having cam 29 rigidly mounted thereon and being rotated by the same motor 5 that rotates shaft 2, but at a much faster rate, as, for example, once every six seconds. Normally, a catch 32 engages a notch 30 on the crosspiece of lever 18 so the lever with pin 19 is held stationary and the pin acts as a fulcrum for lever 25 which is moved by cam 29 bearing against roller 31 fastened thereto. The movement of lever 25 is transmitted through pivot 24 to rotate lever 22 in a counter-clockwise direction around shaft 14. At a point in the rotation of cam 29 from the position shown in Fig. 1 to that of Fig. 2, which point will depend on the flow value at the time as will hereinafter be explained, catch 32 is lifted from notch 30 of lever 18 and a brake 33 is moved into engagement with the arcuate edge of the crosspiece of lever 22 thereby holding lever 22 and pivot 24 in place. As the cam 29 continues to rotate, lever 25, with pivot 24 now acting as its fulcrum, will move pin 19, which movement continues until roller 31 is concentric with shaft 14 as shown in Fig. 2, at which time a reverse operation takes place as the surface of cam 29 recedes. In the course of the clockwise movement of lever 25 about pivot 24, pin 19 will be engaged by lever 25 to rotate lever 18 clockwise about pivot 14, unless the engagement of pin 19 by lever 25 takes place just at the time roller 31 assumes its terminating position of Fig. 2. At some point in the movement of the lower ends of levers 18 and 22, either surface 21 or 23 thereof will contact pin 34 on arm 13 and move it and the pen arm to a position determined by the positions of the lever 18 or 22 assumed during a cycle and thus power set the pen. Whether the pin 34 is engaged by surface 21 or surface 23 will depend on the existing position of the pin relative to the new flow value and of course if that value is exactly the same as it was during the preceding cycle both surfaces 21 and 23 will simultaneously contact pin 34. These levers will be moved relatively more or less from their initial positions depending upon the point in the cycle at which the catch 32 is removed from notch 30 and the brake 33 is applied to lever 22. The point at which the release of the catch and the application of the brake occurs is determined by the rate of flow at that time. The means for releasing the catch will now be described.

Attached to lever 22 and movable therewith is an arm 35, which as its lower end rises due to movement of the lever, bears against and moves to the right an overweighted member 36 also pivoted on shaft 11. Pivoted to the instrument framework at 37 is a lever 38 having a depending arm 39 and having a generally horizontal arm to which are pivoted at 38a, the two levers 41 and 42 which are mounted for movement together and form in effect a bellcrank lever. The brake member 33 is fastened to lever 38 and the catch 32 is pivoted at 37 and moves with 38 by means of a lost motion connection at 32a. The entire assembly (Fig. 1A) consisting of levers 38, 41, 42, the catch 32, and brake 33 form a latch mechanism that is normally biased in a clockwise direction by spring 43. The lower end of lever 41 has a notch 44 that rests on an out turned edge 44a of member 36, being held thereon by the force of spring 43. As member 36 moves to the right under the influence of arm 35, it pulls lever 41 along with it and thus forces lever 42 upward until the latter comes into contact with pin 45 on lever 9, which is at that time held from movement, to stop levers 41 and 42. Continued movement of member 36 to the right causes notch 44 to fall from the edge 44a and permits spring 43 to pull the latch assembly in a clockwise direction to lift catch 32 from notch 30 and apply brake 33 to the upper edge of lever 22. It is at this time that lever 22 stops moving and lever 18 starts to move by reason of the clockwise movement of lever 25, so that the edges 21 and 23 position the pen arm by their contact with pin 34 as shown in Fig. 2. In order to prevent movement of lever 9 and thus prevent a change of its position when contacted by lever 42 a brake 46 pivoted at 46a is pulled by spring 47 into contact with the inner surface of arc 12.

The brake 46 is controlled by a cam 48 fastened to shaft 28, which is so timed with respect to cam 29 that as the low part of cam 29 begins to come under roller 31 the cam 48 comes under roller 49 on brake 46 to raise the brake and permit lever 9 to be adjusted according to the flow, from armature 4. As the brake is raised it bears against the lower end of arm 39 to move the lever 38 and its attached parts in a counter-clockwise direction and lift brake 33 from lever 22, permitting catch 32 to fall in notch 30 when the notch comes beneath it upon the return of the levers 18 and 22 to their initial positions under the influence of spring 26. This movement of member 38 also lifts lever 41 so that notch 44 can re-engage edge 44a of member 36, which is then permitted by the recession of arm 35.

In the operation of the device the parts are initially positioned as shown in Fig. 1 and the full line position of Fig. 1A. As cam 29 rotates in a counter-clockwise direction, the lower end of lever 22 is moved to the right and, as shown, if the arm 13 is then in its zero scale position as shown in full lines it is moved to the right by contact between edge 23 and pin 34, assuming that at that time the flow value is 50% of maximum measurable value or thereabouts. Continued movement of lever 22 will, by means of arm 35 attached thereto, move member 36 and lever 41 to the right until lever 42 strikes pin 45 on lever 9 to cause the disengagement of notch 44 and edge 44a as shown by the broken lines in Fig. 1A. When this occurs member 38 will be moved clockwise by spring 43 causing catch 32 to be lifted from notch 30 to release lever 18, and brake 33 lowered into engagement with the arcuate crosspiece of lever 22 to stop the latter. The position then occupied by arm 13 is its final position in that cycle as shown in dotted lines in Fig. 1, and the positioning of arm 13 by lever 22 as described will take place whenever arm 13 is displaced clockwise from its final position. Continued rotation of cam 29 will then move lever 18 clockwise until surface 21 engages pin 34 which it will do when the highest part of cam 29 has reached roller 31 and as the lowest part approaches, spring 26 will tend to move the levers 18 and 22 back to their initial positions. Just after the highest part of cam 29 passes roller 31 the leading edge of cam 48 contacts roller 49 to lift the brake 46 and free lever 9 from restraint so that it can be readjusted. This movement of brake 46 as has been stated above also raises arm 39 on member 38 to permit the latch mechanism to be reset. The high surface of cam 48 is of sufficient extent to hold the brake 46 up long enough to permit lever 9 to get an accurate setting and at the same time hold member 38 up until arm 35 has moved down enough so that the edge 44a of lever 36 can come under notch 44 of lever 41 to reset the latch mechanism.

If in the sequence of operation just described and with a corresponding flow value, pin 34 were disposed counter-clockwise of the said final position shown in dotted lines in Fig. 1, arm 13 would be positioned by engagement of edge 21 of arm 18 therewith but would terminate in the same final position for the same flow value.

It will be seen that regardless of the previous position of the pen arm that as the levers 18 and 22 move together to the position of Fig. 2, the pen will be moved by a positive force entirely independent of the armature 4 of the induction bridge. No matter what the position of lever 9 may be, the pen will be set accordingly since the possible range of movement of levers 18 and 25 is such that they can force the pen arm from a position of zero flow to a position of 100% flow or vice versa. The use of two positively moving members either of which may set the pen throughout its entire range, gives an extremely accurate and positive pen setting means.

Figure 3:
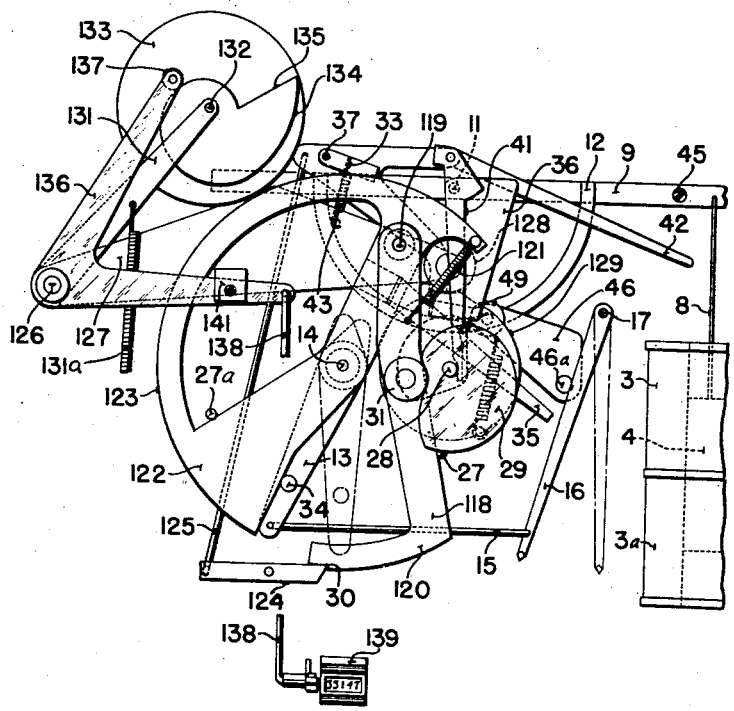
Fig. 3 is a view similar to Fig. 1 of a different form of the invention.
Figure 4:
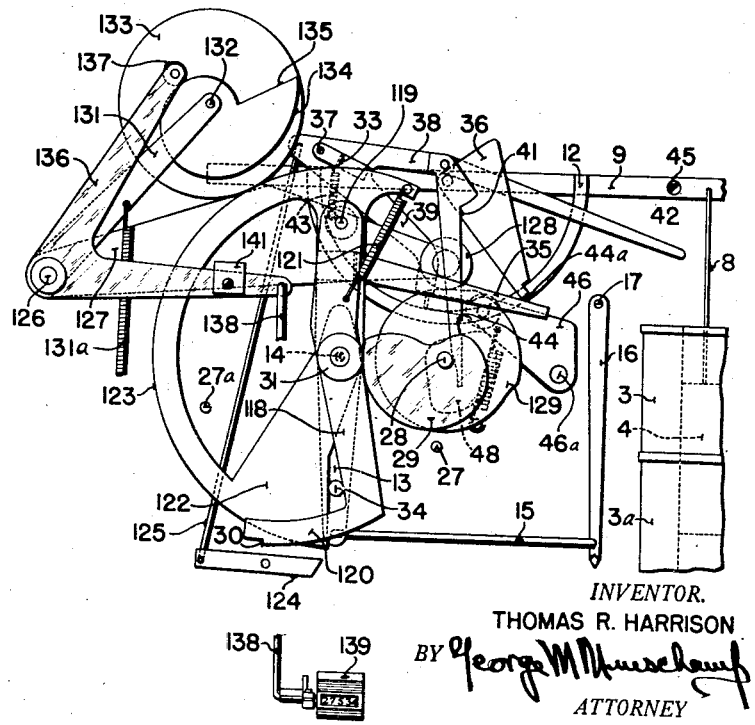
Fig. 4 is similar to Fig. 3 with the parts in different positions.

The mechanism shown in the modification of Figures 3 and 4 works in a manner identical to that above described, the main difference being in the shape of the pen setting levers and the addition of an integrating element. In this modification lever 122 has an arc 123 extending from its ends and concentric with shaft 14 around which the lever is pivoted. Lever 118 is pivoted to lever 122 at 119 and has its lower end offset as shown at 120, the outer end of the offset portion having a notch 30 formed therein. A spring 121 is fastened at its ends to the two levers and tends to pull them into the position shown in Fig. 3 with the lower end of lever 118 abutting stop 27 and the lower end of lever 122 abutting stop 27a. This position can only be assumed when roller 31, attached to lever 118, is contacting the lowest portion of cam 29. It is noted that the cam 29 in this modification has a slightly different contour from that of the embodiment of Fig. 1. The difference is solely due to the different shape of the levers since the cam functions in the same manner.

As the cam 29 rotates it bears against roller 31 on lever 118. Since lever 118 has the notch 30 in its lower end in engagement with catch 124 it pivots around this point and through the pivot 119 at its upper end forces lever 122 to rotate in a counter-clockwise direction. The rotation of lever 122 continues as arm 35, fastened thereto in the same manner that arm 35 is fastened to lever 22 of the embodiment of Fig. 1, engages member 36 of the latch mechanism and forces it to the right. The member 36, through its edge 44a and catch 44 on lever 41, moves levers 41 and 42 counter-clockwise until movement of levers 41 and 42 is stopped by engagement between 42 and pin 45. Continued movement of lever 122 then causes the arm 35 to move member 36 enough to disengage parts 44 and 44a thereby permitting lever 38 to move clockwise under the bias of its spring 43. As lever 38 moves it forces brake 33, attached thereto, into engagement with arc 123 of lever 122 to stop that lever from rotating and by means of link 125 moves catch 124 out of the notch 30 in arm 120 of lever 118. Release of the catch 124 frees lever 118 from any restraint so that the cam 29 may move it around its pivot 119, against the tension of spring 121, until the highest point of the cam is under roller 131 which is then concentric with shaft 14. At this time the lower ends of levers 122 and 118 have come together to positively position pin 34 on arm 13 and thereby to properly position the pen arm as was described in connection with the embodiment of Fig. 1.

Continued rotation of cam 29 will permit the levers 122 and 118 to move to their initial positions under the influence of spring 121 and arm 35 will move downwardly. As cam 29 is permitting levers 118 and 122 to move to their initial positions cam 48 will come under roller 49 of brake 46 to lift the brake off arc 12 to free lever 9 and the brake will engage arm 39 to lift lever 38 in a counter-clockwise direction so that when edge 44a of member 36 comes under catch 44 of lever 41 the latch mechanism will be reset.

The integrating mechanism is actuated by contact of roller 133 with the surface of arm 123 as the lever 122 is being moved. This mechanism is supported upon a shaft 126 off to one side of the above described mechanism. Upon the shaft 126 is pivoted a lever 127 having at its outer end a roller 128 bearing on the surface of a cam 129 also fastened to and rotating with shaft 28. Also pivoted on shaft 126 is an arm 131 having at its outer end a stub shaft 132 about which rotates a combined roller 133 and cam 134 normally bearing on the upper surface of lever 127 under the bias of spring 131a. The cam has a gradual rise that ends in a radial surface 135. Bell crank lever 136 is also pivoted on shaft 126 and has on one arm a roller 137 bearing on cam 134 and has its other arm attached by a link 138 to an ordinary form of ratchet counter 139.

The cam 129 has a high portion and low portion and is so adjusted on shaft 28 relative to cam 29 that as cam 29 begins to move lever 122 from its initial position in Fig. 3 at the start of a cycle, the low portion of cam 129 will come under roller 128 thus lowering lever 127 and permitting the roller 133 to rest on the arc 123 of lever 122 and be driven thereby. The roller will therefore be rotated an amount depending upon the amount of movement of lever 122 and will rotate cam 134 a corresponding amount. As cam 134 rotates it gradually lifts roller 137 to move bell-crank 136 in a counter-clockwise direction against the weight of 141 and weight of link 138. This lifting continues until roller 137 comes to the radial surface 135 at which time the bell-crank will fall in a clockwise direction to actuate the counter and thereby record the total flow. Roller 133 bears on arc 123 until cam 29 has rotated to the position of Fig. 4, at which time the high part of cam 129 comes under roller 128 to lift lever 127 and bring its upper surface into contact with the roller 133 to move it out of contact with arc 123 before lever 122 begins to move back to its initial position. Since the roller 133 is at all times resting on either arc 123 or the upper edge of lever 127, it is never free to rotate of its own accord. This insures that the counter 139 will only be actuated by positive rotation of roller 133 when in engagement with surface 123.

It is noted that an integrating mechanism similar to that just described could, if desired, be added to the modification of Fig. 1 by having roller 133 bear on the curved surface of the cross piece of lever 22, that is the same surface that brake 33 bears on. It is noted, furthermore, that the lever 122 of Figs. 3 and 4 as well as the lever 22 of Figs. 1 and 2, may be considered as a lever moving from an initial or zero position to a position depending upon the existing flow value and at regular intervals so that it may be termed an integrating lever.

In the modification of Figures 5 to 8 the pen is set with a pair of levers as was done in the above described modifications but the manner of adjusting the extent of movement of the levers differs therefrom. In this modification the pen arm 16 is attached to a yoke 201 that pivots around an axis 202 which consists of a shaft back of the segment plate 1A. Attached to the shaft is an arm 203 connected by a link 204 to another arm 205 which is pivoted on shaft 14. In this case the arm 13 is fastened to arm 205 so that movement of the arm 13 will, through the above described linkage, cause a corresponding movement of the pen arm.

Mounted for rotation on shaft 14 is a segment shaped lever 218 corresponding to lever 118 of Fig. 3 that has at its lower end a finger with a straight inner edge 221. Pivoted to the upper end of this lever is another lever 222 corresponding to lever 122 of Fig. 3 which terminates at its lower end wtih a finger having a straight inner edge 223. The levers 218 and 222 are normally biased by gravity so that lever 218 tends to turn clockwise around shaft 14 into engagement with a stop 218a, and lever 222 tends to turn counter-clockwise around its pivot point 222a. Between the ends of the lever 222 is mounted a cam following roller 31 which bears upon cam 29 mounted for rotation with shaft 28. Also on shaft 28 is another cam 208 that has a pin 209 on it the position of which is adjusted with respect to cam 29 so that upon rotation of the shaft the cams and pin will act upon the various parts in a predetermined sequence.

There is a yoke which consists of two members 206 joined at their lower ends by a cross piece 207. The upper ends of the member 206 of the yoke are placed on shaft 11 and they are attached to a downwardly projecting portion 9b of the member 9, as shown in dotted lines in Figure 5. Therefore the cross piece 207 moves with the lever 9 according to the flow to be measured.

In the casing below the above described mechanism are two shafts, one of which 211, has mounted thereon lever 212 biased in a counter-clockwise direction by a spring 213 and adapted to contact with cross piece 207. The other shaft 214 has pivoted on it a member 215, which contains three projections, the first of which carries a cam roller 216 bearing on cam 208, the second is a curved finger 217 the lower edge of which acts as a brake for a purpose to be described, and the third is a finger 219 that is fastened at its outer end to a spring 224 which tends to move the entire lever in a counter-clockwise direction. A lost motion connection consisting of pin 225 on member 215 and a hole 226, in lever 212, of a diameter larger than that of the pin is used to connect the member 215 and lever 212 so that movement of member 215 will cause member 212 to move a smaller amount. Also mounted for movement on shaft 214 is a curved lever 227 having two cam surfaces 228 and 229 and having adjustably secured to its lower end a stop member 231 to engage the cross piece 207. An eccentric screw 227a in the member 227 is received in a slot 231a of the member 231, whereby rotation of the screw will adjust member 231 relative to member 227. A screw 227b received in an opening in the member 231 is used to clamp the latter in its adjusted position relative to member 227.

Fastened to shaft 14 is a yoke consisting of arms 232 joined at their lower ends by rods 233 and 234. Also mounted to move with shaft 14 and yoke 232 is a lever 235 that has a projection 236 acted upon by pin 209 on cam 208 during the rotation of the latter. The yoke and lever are normally biased in a clockwise direction by spring 237 which is fastened at one end to the lever 235 below shaft 14 and at its other end to a stationary part of the mechanism.

In the operation of the device the start and finish of a cycle may be considered to be the point at which the parts assume the position of Fig. 5 in which the lever 13 and pin 34 are positively positioned by surfaces 221 and 223 of the levers 218 and 222. The parts at that instant are relatively stationary and mutually locked against movement.

Cam 208, in its clockwise rotation, moves roller 216 to the right, thus moving member 215, and through the pin and slot connection 225, 226, the lever 212, so that the lower edge of this lever and the lower edge of the lever 215 no longer engage the cross piece 207 of the yoke 206 and the cammed surface of finger 217 no longer bears against rod 234 of the yoke 232 as is shown in Fig. 5. Further rotation of the cam 208 brings pin 209 under the projection 236 on lever 235. (This is best shown in Fig. 8.) Continued movement of the pin 209 forces lever 235 and yoke 232 to move in a counter-clockwise direction. During this movement, rod 234 bears on surface 229 of the lever 227 and lifts it until the member 231 is free from engagement with the cross piece 207. The arm 9 and its yoke 206 are now free from any engagement and can be moved to a position determined by armature 4 in the coils 3, 3a. Continued rotation of the shaft 28 lets the lever 215 move in a counter-clockwise direction under the influence of spring 224 until the lower edge of lever 212 engages the cross piece 207 to hold it in its then position. At this time the edge 236 of the lever 235 rides off the pin 209 and lever 235 and the yoke 232 move in a clockwise direction under the influence of spring 237. As the yoke moves, rod 233 bears against surface 228 of lever 227 and moves this lever downwardly until the lower edge of member 231 attached thereto strikes the cross piece 207. This definitely positions the yoke depending upon the position of the lever 9 and the flow. Continued rotation of the shaft 28 lets the low part of cam 208 come underneath of roller 216, and this permits spring 224 to move member 215 in a counter-clockwise direction until the bottom surface of its finger 217 bears on rod 234 to hold the yoke positively in position. The parts are thus frictionally held in a certain relation depending upon the setting of the lever 9.

When this positioning has occurred, the high part of cam 29 begins to move into contact with roller 31, and forces this roller and its lever 222 around the pivot 222a until the surface 223 at the lower end of this lever strikes the rod 233 now locked in position. Continued rotation of cam 29 will now move lever 218 around its pivot 14 by means of lever 222 which is then pivoting about rod 233, thus moving the surface 221 towards the rod 233. The pin 34 on arm 13 if positioned between surfaces 221 and 223 will be moved until it is in line with rod 233 and pivot 14, thus setting the pen arm to a position corresponding to that of the yoke 232 and therefore the flow, as shown in Fig. 5. At this time, the cam 29 has moved roller 31 until it is coaxial with shaft 14. This completes the cycle of operation of this modification of the invention and it is seen that the pen is positively positioned in accordance with the position of lever 9 which is controlled by the manometer and the flow of the condition being recorded.

As the cam 29 moves further it permits the lever 218 and lever 222 to open freeing the pen arm and the arm 13. This is permitted since the upper end of the lever 218 plus the lever 222 are heavier than the lower end of the lever 218 and they will move under the force of gravity to the positions shown in Figs. 7 and 8. The pen will, however, be held in place on the chart by slight friction in its moving parts.

In this form of my invention, an integrator of the type shown in connection with Figs. 3 and 4, may be used if desired. In this modification, the integrator wheel 133 would bear against the arcuate surface 218a of the lever 218 and would function in a manner already described in connection with the modification of Figs. 3 and 4.

By varying the shape of lever 227 and the lower edge of member 231, any desired type of chart may be used in the device. In the present modification, the shape of member 231 and lever 227, when taken together cause the pen arm to be moved along the chart in such a manner that the movement of the pen arm is through an equal arc with equal increments of flow. This permits a chart of even graduation such as is shown in Fig. 5.

One of the important features of the invention is the fact that each of the levers used for setting the pen is capable of moving on either side of mid-position so that during the operation of the device the pen setting member is always positively moved to the correct position by a force which may be as great as desired and such force is available from each direction. One lever insures movement of the setting member as far as is necessary, and the other safeguards against over travel.

The relative simplicity of the device coupled with its accurate pen setting feature by an auxiliary source of power make this invention one of great utility.

While in accordance with the provisions of the statutes, I have illustrated and described the best forms of my invention now known to me, it will be apparent to those skilled in the art that changes may be made in the forms of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent, is:

1. In a measuring instrument, a pen arm movable about a pivot, a first lever pivoted to move around a point, a second lever pivoted to move around said point, a catch and a brake member adapted to cooperate successively with said first and second levers respectively, means for moving said second lever about said point towards said first lever, means for releasing said catch and setting said brake, said moving means thereafter moving said first lever about the point toward the second lever, and means connected to said pen arm and engaged by said levers as they move together to thereby move said pen arm.

2. In a measuring instrument, means adapted to adjust an element responsively to the fluctuations of a variable condition including a first lever and a second lever movable about a pivot, members adapted to hold said levers successively against movement, means for adjusting one lever while the other is held, means responsive to said condition for moving said members to hold the adjusted lever and release the other, and mechanism operated by said adjusting means for thereafter adjusting the other lever.

3. In a measuring instrument, a movable arm, a member connected for movement wtih said arm, means for moving said member consisting of two pivoted levers, said levers having a part on each for engaging said member as the levers move, and an adjustable stop mechanism for successively acting on said levers, means to move the one lever not stopped, means to adjust said stop mechanism to release one lever and stop the other, said moving means then moving the other lever and by means of said part, moving said member and arm.

4. In a measuring instrument, a first pivoted lever, a second lever pivoted coaxially with said first lever and having a pin thereon, a third lever pivoted to said first lever and contacting with said pin, an adjustable catch and stop for acting successively on said second and first levers respectively, a rotating cam for moving said third lever and through its pivot the first lever, means for adjusting the catch and stop to release the second lever and stop the first, said cam thereafter continuing to move the third lever and through the pin the second lever, a movable arm and means connected to the arm adapted to be contacted by said first and second levers whereby the arm is moved as the levers move.

5. In a meter, an arm, a member connected to said arm for actuation thereof, said member having a projection thereon, a first pivoted lever, a second pivoted lever, means for successively moving said levers for a given total distance, means for determining the amount of movement and succession of movement of the levers, said determining means being actuated in accordance with the value of a condition to be measured, means for causing the moving means to move said first lever part of said distance until the determining means is actuated and thereafter move said second lever the remainder of said distance, the projection being in the path of movement of one of said levers whereby as the levers are moved the projection, member and arm will be moved accordingly.

6. In a measuring instrument, a pair of movable pivoted levers, an arm, a member mounted for moving said arm having a projection between and in the path of movement of said levers, means for successively moving said levers from predetermined positions to a position dependent upon the value of a condition, said levers thereby moving said projection to set the arm, and means connected to each lever for returning the levers to their original positions.

7. In a meter, a member positioned in accordance with the value of a condition to be measured, an arm to be moved to a position proportional thereto, an adjustable stop, means to contact said member and thereafter position said stop, a pair of levers movable through a path, a second arm on one lever adapted to move said first means, means to move said one of said levers through a portion of said path until said second arm causes said first means to adjust said stop and thereafter move the other lever through the remainder of said path and means on said first arm to be engaged and moved by one of said levers.

8. In a meter, a first adjustable element, mechanism to adjust an exhibiting arm comprising a second adjustable element, a member positioned in accordance with the value of a condition, means for adjusting said first element to a position corresponding to that of said member, means to brake said element, mechanism operated by said first means for thereafter adjusting said second element, and means having a portion lying between said elements for positioning said exhibiting arm by the adjustable elements.

9. In a measuring instrument, a member positioned in accordance with the value of a condition to be measured, a brake for periodically preventing movement of said member, an element for contacting said member when braked, a latch mechanism controlled by said element, means for moving said element into contact with said member to release said latch mechanism, a pen arm, means controlled by said latch mechanism for positioning said pen arm, and mechanism for operating said last mentioned means.

10. In a measuring instrument, mechanism to adjust a pen arm comprising a member positioned in accordance with the value of a measurable condition, an element for contacting said member, a pair of adjustable levers, an arm mounted on one of said levers to move said element into contact with said member, means for moving said one of said levers until said element contacts said member, said means thereafter moving said other lever, and means operated by said levers for positioning said pen arm from said levers as said levers are moved.

11. In a measuring instrument, an element movable in response to variations in a measurable condition, a member to be moved to a position corresponding thereto, relay means to move said member comprising a pair of pivoted levers each having an end adapted to move through a given path, a portion of said member extending between said lever ends and into said path to be engaged by one of said lever ends as they move mechanism operative to move first one of said lever ends through a portion of said path and then to move the other of said lever ends through the remainder of said path to properly position said member, stop mechanism operative to prevent movement of one of said lever ends until the other is properly positioned and then engage said other lever, and means operated by said mechanism in response to the position of said element to actuate said stop mechanism.

12. In a measuring instrument, a movable member, first and second pivoted levers each of which has an end, an adjustable stop adapted to be engaged by and to stop one of said lever ends, an element positioned in accordance with the value of a condition to be measured, means operative to adjust said stop to a position corresponding to that of said element, means including a constantly rotating cam for sequentially moving the end of each of said levers to move first the end of one of the levers from a first position into a second position engaging the stop and thereafter to move the end of the other lever from a first position into a second position corresponding to the position of the stop and means on said member engaged by one or the other of the lever ends as the latter are moved to the second position to adjust the member to a position corresponding to the position of the stop.

13. In a measuring instrument, a pair of levers each having an end and each pivoted to move around a given point, means to move said lever ends one after the other from different given positions toward each other, an adjustable member, means forming part of the end of each of said levers adapted to engage said member if said member is in the path of one lever end as it moves toward the other, to position said member by one of said lever ends, an adjustable stop for one of said lever ends, means to adjust said stop in correspondence with the value of a measurable condition to thereby stop said lever end when it is positioned at that point, said moving means operating to move said one of the lever ends from its given position until it engages said stop and to thereafter move the other lever end from its given position toward the first, said member accordingly being adjusted by said lever ends.

14. In a measuring instrument, a first lever movable about a pivot to move an end thereof from a predetermined point through a path, a second lever movable about a pivot to move an end thereof from a second predetermined point through said path, an adjustable member adapted to be engaged by an end of one of said levers and moved thereby as the lever end moves from its predetermined point, an element movable to a position proportional to the value of a condition, an adjustable stop in the path of movement of said levers, means to position said stop in correspondence with the position of said element, means to move one of said lever ends from its predetermined point through said path until it is stopped by said adjustable stop, said moving means thereafter moving said other lever end from its predetermined point through said path toward the adjustable stop, one of said lever ends serving to move said member to a position corresponding to that of said stop.

15. In a meter, a member positioned in accordance with a condition to be measured, a part, means to position said part in accordance with the position of said member, a pair of levers each having an end and each pivoted for movement around an axis, means to move the end of one of said levers around the lever axis through a path from a predetermined point to a position determined by engagement with said part, said moving means subsequently moving the end of the other lever from a second predetermined point through said path to a position dependent upon the position of the first lever end, an arm, an element mounted for movement therewith, and means on said element in the path of movement of said lever ends and engaged by one or the other of said lever ends upon movement thereof from its predetermined point to position said element and arm in accordance with the adjusted position of said lever ends.

16. In a meter, a member movable to a position proportioned to the value of a measurable condition, means to periodically engage said member, an adjustable element moved by said means to a position corresponding to that of said member, a pair of levers each having an end and each pivoted for movement around an axis, means to move the end of one of said levers in one direction through a path from a predetermined point to a point determined by engagement with said element and thereafter move the end of the other lever from a second predetermined point through said path in the opposite direction to a position dependent upon the position of the first lever end, an arm, a part mounted for movement with said arm and having a portion in the path of movement of said lever ends whereby it will be engaged by one of said lever ends and moved to move the arm.

17. In a meter, a pair of levers each pivoted on an axis and each having an end adapted to move from different predetermined points in opposite directions through the same path, a member having a projection extending into the path of movement of said lever ends, means including a rotatable cam operative to successively move said lever ends, each through a portion of said path for a total distance equal to that of the path, means to determine the amount of movement of each lever end, mechanism to operate said means in accordance with the value of a measurable condition, means to rotate said cam whereby said cam will move one lever end from a given point a portion of said distance for an amount determined by said determining means and thereafter move said other lever end from a second given point in an opposite direction for the remainder of said distance, said projection being positioned by one of said lever ends as the latter is moved, to a position in accordance with the final position of said lever ends.

18. In a meter, a first lever having an end adapted to be moved from a given position at one end of a path in one direction through said path, a second lever having an end adapted to be moved from the other end of said path in the opposite direction through said path, an adjustable stop in said path for one of said lever ends, mechanism to move said stop to a position in accordance with the value of a measurable condition, a member having a part extending into said path, means to move said first lever end through a portion of said path until it engages the stop and thereafter move the other lever end through the remainder of said path, one of said lever ends engaging the part of said member to move the latter to a position in accordance with the final position of said lever ends.

19. In a measuring instrument, the combination with an element moved in response to the variations in a measurable condition, of a first pivoted lever one end of which is adapted to move from a first position through a path to a second position, a second lever pivoted to the first lever, one end of which is adapted to be moved through said path from the second position to the first position, a stop mechanism in the path of said levers, a cam to periodically move one of said lever ends through a portion of the path through which said lever end moves until it engages said stop mechanism, said cam thereafter moving said lever around its end engaging the stop mechanism as a pivot to move the other lever through the connection between the levers to move the end of the second lever through the remainder of said path, means operated in accordance with the position of said element to actuate said stop mechanism, and means located in said path to be engaged and moved by one of said lever ends to be positioned thereby.

THOMAS R. HARRISON.